(12) United States Patent
Wen

(10) Patent No.: US 8,693,687 B2
(45) Date of Patent: Apr. 8, 2014

(54) METHOD AND APPARATUS OF PROCESSING THREE-DIMENSIONAL VIDEO CONTENT

(75) Inventor: Shang-Chieh Wen, Tainan County (TW)

(73) Assignee: Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 351 days.

(21) Appl. No.: 12/896,903

(22) Filed: Oct. 3, 2010

(65) Prior Publication Data
US 2012/0082309 A1 Apr. 5, 2012

(51) Int. Cl.
*G06F 21/00* (2013.01)
(52) U.S. Cl.
USPC .............. 380/258; 726/1; 713/164; 713/176; 380/200; 380/201; 705/50; 705/75
(58) Field of Classification Search
USPC ......................................... 380/210, 212, 258
See application file for complete search history.

(56) References Cited

U.S. PATENT DOCUMENTS

| | | | | | |
|---|---|---|---|---|---|
| 6,049,613 | A | * | 4/2000 | Jakobsson ....................... | 380/47 |
| 6,519,341 | B1 | * | 2/2003 | Enari ............................. | 380/217 |
| 6,914,637 | B1 | * | 7/2005 | Wolf et al. .................... | 348/473 |
| 7,295,673 | B2 | * | 11/2007 | Grab et al. .................... | 380/239 |
| 2003/0059048 | A9 | * | 3/2003 | Blum et al. ................... | 380/258 |
| 2003/0235303 | A1 | * | 12/2003 | Evans et al. ................... | 380/216 |
| 2004/0131184 | A1 | * | 7/2004 | Wu et al. ....................... | 380/202 |
| 2004/0158534 | A1 | * | 8/2004 | Zahir Azami et al. .......... | 705/75 |
| 2004/0174998 | A1 | * | 9/2004 | Youatt et al. .................. | 380/210 |
| 2004/0252186 | A1 | * | 12/2004 | Mashitani et al. .............. | 348/51 |
| 2005/0097596 | A1 | * | 5/2005 | Pedlow, Jr. ..................... | 725/31 |
| 2005/0114669 | A1 | * | 5/2005 | Ho et al. ....................... | 713/176 |
| 2007/0011552 | A1 | * | 1/2007 | Altmann ....................... | 714/746 |
| 2007/0124645 | A1 | * | 5/2007 | Ito et al. ....................... | 714/758 |
| 2008/0043203 | A1 | * | 2/2008 | Jacobs et al. ................... | 352/63 |
| 2010/0135488 | A1 | * | 6/2010 | Lee et al. ...................... | 380/200 |
| 2010/0245346 | A1 | * | 9/2010 | Tanaka et al. ................. | 345/419 |
| 2010/0272417 | A1 | * | 10/2010 | Nagasawa et al. .............. | 386/97 |
| 2011/0169919 | A1 | * | 7/2011 | Karaoguz et al. .............. | 348/46 |
| 2011/0249757 | A1 | * | 10/2011 | Newton et al. ........... | 375/240.25 |
| 2011/0274274 | A1 | * | 11/2011 | Hsu et al. ..................... | 380/212 |

OTHER PUBLICATIONS

Stereoscopic television MPEG-2 multi-view profile, "Rep. ITU-R BT.2017", http://www.itu.int/pub/R-REP-BT.2017-1998, ITU, 1998, p. 1-7.
Bin B. Zhu et al., "Scalable Protection for MPEG-4 Fine Granularity Scalability", IEEE Transactions on Multimedia, vol. 7, No. 2, Apr. 2005, 2005 IEEE, p. 222-233.

* cited by examiner

*Primary Examiner* — Morshed Mehedi
(74) *Attorney, Agent, or Firm* — Winston Hsu; Scott Margo

(57) ABSTRACT

The present invention introduces methods and apparatus of encrypting/decrypting three-dimensional (3D) video content. The inventive methods and apparatus can achieve a flexible payment/authorization mechanism for the 3D video content. A user can choose to view only 2D images corresponding to the video content, or pay an authorization fee that allows the user to view the entire 3D video content.

20 Claims, 10 Drawing Sheets

METHOD AND APPARATUS OF PROCESSING THREE-DIMENSIONAL VIDEO CONTENT

BACKGROUND OF THE INVENTION

1. Field of the Invention

The present invention relates to a three-dimensional video content, and more particularly, to a method and a related apparatus of encrypting/decrypting the three-dimensional video content.

2. Description of the Prior Art

For copyright protection, multimedia data content usually needs some encryption mechanism to prevent unauthorized access. For example, video content sometimes needs to be encrypted for ensuring a secure transmission (via Internet or broadcasting), thus preventing unauthorized third parties from eavesdropping on the video content. This allows the owner of the video content to either forbid viewing, or collect revenue at his or her discretion.

Three-dimensional (3D) video content is increasingly used in the movie industry or for household application; however, there is still not a proper solution to the encryption/decryption mechanism of the 3D video content.

SUMMARY OF THE INVENTION

With this in mind, it is one objective to provide methods and related apparatus of performing encrypting/decrypting processing on 3D video content. In particular, the inventive method and apparatus provides a conception of separately encrypting/decrypting the 3D video content which is coded in the form of 2D images and a 3D auxiliary information. This allows users to selectively pay for which video content he/she wants to view (i.e., 2D or 3D video content). For example, if the user only desires to view the 2D video content, he/she will only be charged for the 2D video content. If the user desires to view the 3D video content, he/she will be charged for the 3D auxiliary information and the 2D video content in order to get the full authorization for the 3D video content. Thus, this invention can provide a flexible payment/authorization mechanism for the 3D video content.

According to one exemplary embodiment of the present invention, a method of processing a three-dimensional video content is provided. The method comprises: receiving the three-dimensional video content including a plurality of two-dimensional images and a three-dimensional auxiliary video information corresponding to the two-dimensional images; and utilizing an encryption circuit to generate an encrypted three-dimensional auxiliary video information by encrypting the received three-dimensional auxiliary video information.

According to another exemplary embodiment of the present invention, a method of processing a three-dimensional video content is provided. The method comprises: receiving the three-dimensional video content including a plurality of two-dimensional images and an encrypted three-dimensional auxiliary video information corresponding to the two-dimensional images; and utilizing a decryption circuit to generate a first decrypted three-dimensional auxiliary video information by decrypting the received encrypted three-dimensional auxiliary video information.

According to still another exemplary embodiment of the present invention, an apparatus of processing a three-dimensional video content is provided. The apparatus comprises: a receiving circuit and an encryption circuit. The receiving circuit is configured for receiving the three-dimensional video content including a plurality of two-dimensional images and a three-dimensional auxiliary video information corresponding to the two-dimensional images. The encryption circuit is coupled to the receiving circuit and configured for generating an encrypted three-dimensional auxiliary video information by encrypting the received three-dimensional auxiliary video information.

According to yet another exemplary embodiment of the present invention, an apparatus of processing a three-dimensional video content is provided. The apparatus comprises: a receiving circuit and a decryption circuit. The receiving circuit is configured for receiving the three-dimensional video content including a plurality of two-dimensional images and an encrypted three-dimensional auxiliary video information corresponding to the two-dimensional images. The decryption circuit is coupled to the receiving circuit and configured for generating a first decrypted three-dimensional auxiliary video information by decrypting the received encrypted three-dimensional auxiliary video information.

These and other objectives of the present invention will no doubt become obvious to those of ordinary skill in the art after reading the following detailed description of the preferred embodiment that is illustrated in the various figures and drawings.

DETAILED DESCRIPTION

Illustrative embodiments of the invention are described below. In the interest of clarity, not all features of an actual implementation are described. It will be appreciated that in the development of any such actual embodiment, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

The inventive method and apparatus is involved in the processing of 3D video content, especially those coded in stereoscopic video coding formats, such as 2D plus Depth, 2D plus Delta, 2D plus motion vector. Hence, in the following, the term "3D auxiliary information" may refer to depth, delta or motion vector information depending on which stereoscopic video format the invention is applied to.

Encryption

In the following part, a detailed description regarding the encryption part of the inventive method and apparatus will be explained with reference to several exemplary embodiments. However, reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

Figure 1:
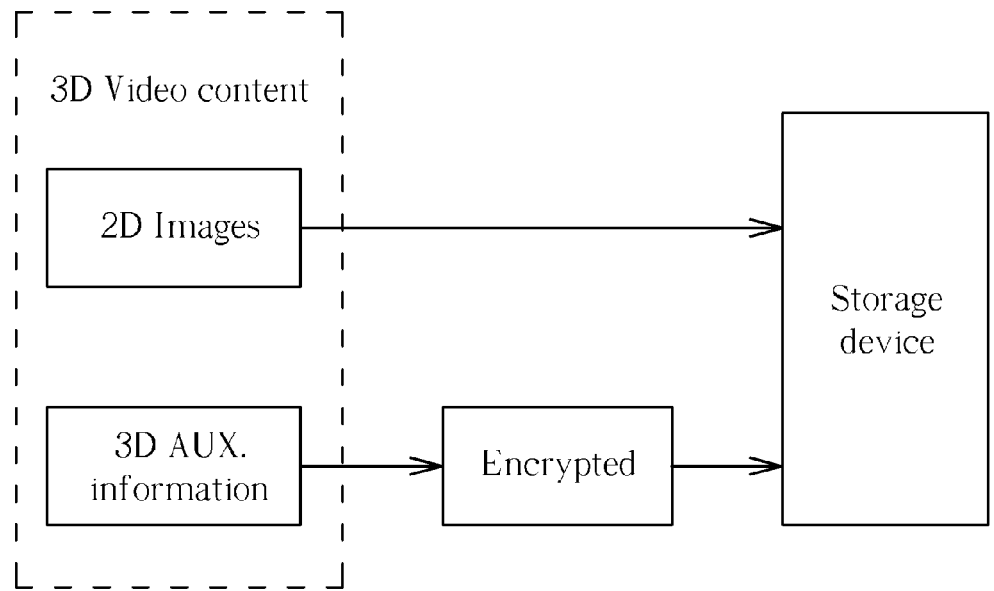
FIG. 1 is a diagram illustrating an inventive encryption manner according to a first exemplary embodiment of the present invention.
Figure 2:
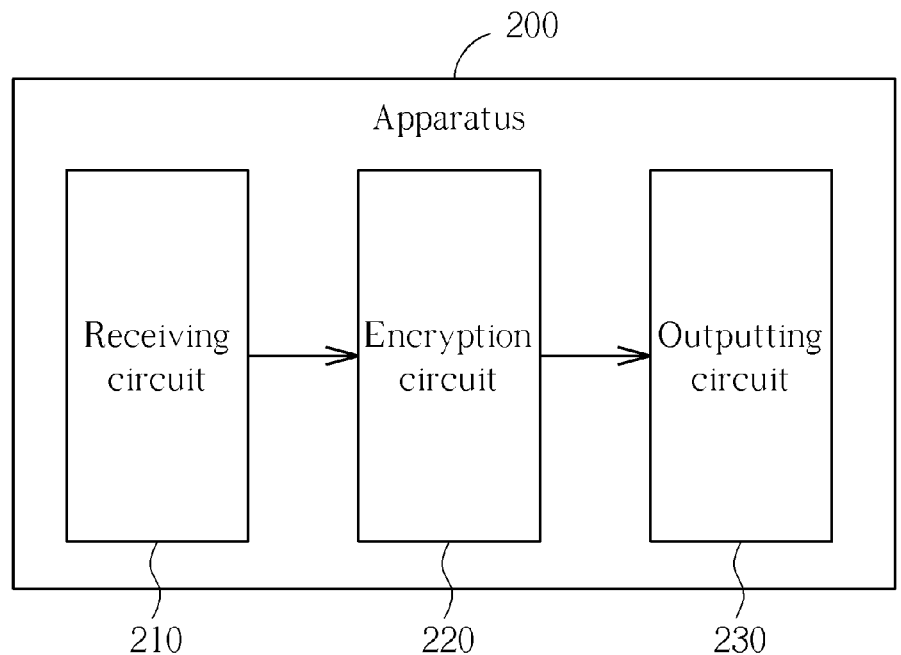
FIG. 2 is a block diagram illustrating an inventive apparatus of the present invention.
Figure 5:
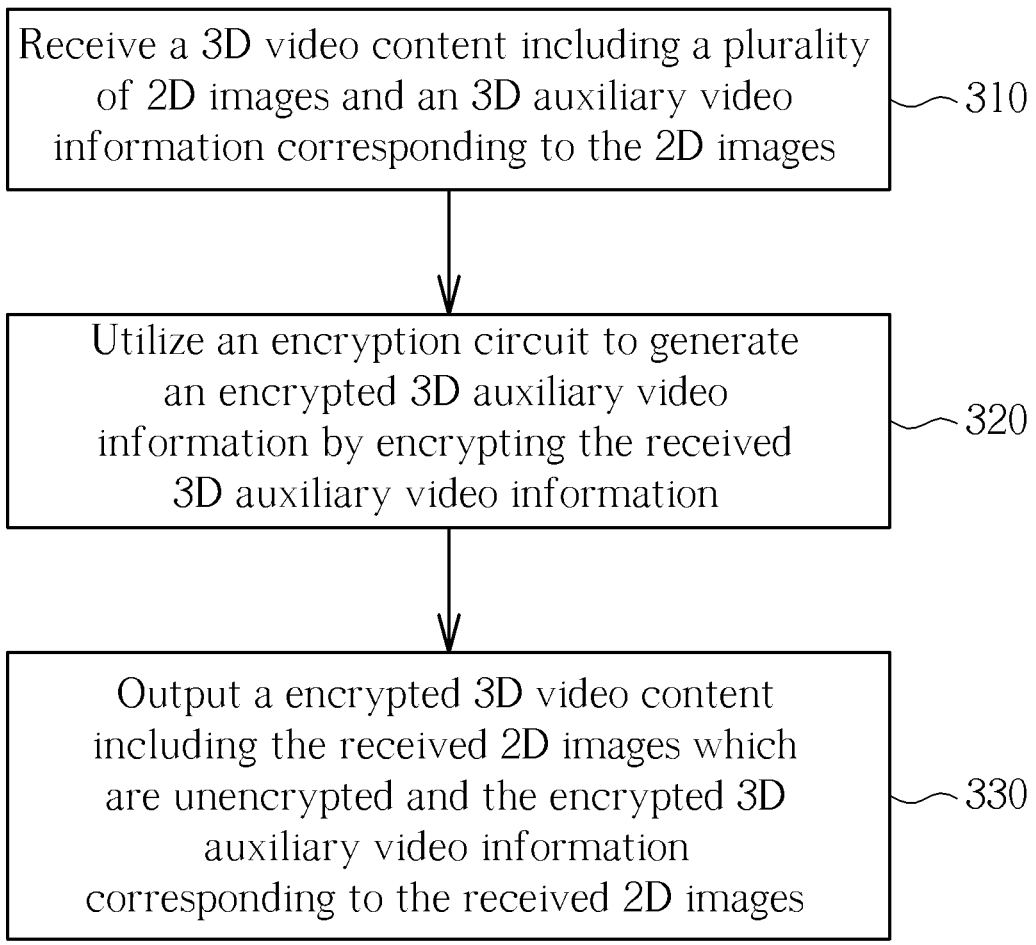
FIG. 5 is a flow chart regarding the inventive encryption manner according to the first exemplary embodiment of the present invention.

Please refer to FIG. 1 and FIG. 2. FIG. 1 is a diagram illustrating an encryption manner of the inventive method according to a first exemplary embodiment, and FIG. 2 is a block diagram illustrating an inventive apparatus of the present invention. As can be seen from the diagram in FIG. 1, a three-dimensional (3D) video content includes a plurality of two-dimensional (2D) images and a 3D auxiliary information corresponding to the 2D images. The 3D video content in this exemplary embodiment may be derived from a conversion on stereoscopic images (i.e., two 3D images next to each other or interleaved). The 3D video content is firstly received by a receiving circuit 210 of the inventive apparatus 200 as shown in FIG. 2. Accordingly, the received 3D auxiliary information of the 3D video content is encrypted by an encryption circuit 220 of the apparatus 200 to generate the encrypted 3D auxiliary information. After encryption, the received 2D images which are unencrypted and the encrypted 3D auxiliary video information will be outputted by an outputting circuit 230 of the apparatus 200 to finish the encryption processing of the 3D video content. The processed 3D video content may be further stored into a storage device, and then distributed through the Internet, or broadcasting. It is also possible to publish the processed 3D video content utilizing a digital versatile disc (DVD) media. A user must get the authorization in advance in order to be allowed to access the processed 3D video content. In this embodiment, only the 3D auxiliary information will be encrypted so that the unauthorized user is only allowed to view the 2D video composed of the unencrypted 2D images. Only when the user pays the fee of the 3D video content will they be authorized. A flow chart corresponding to the first exemplary embodiment is illustrated in FIG. 5.

Figure 3:
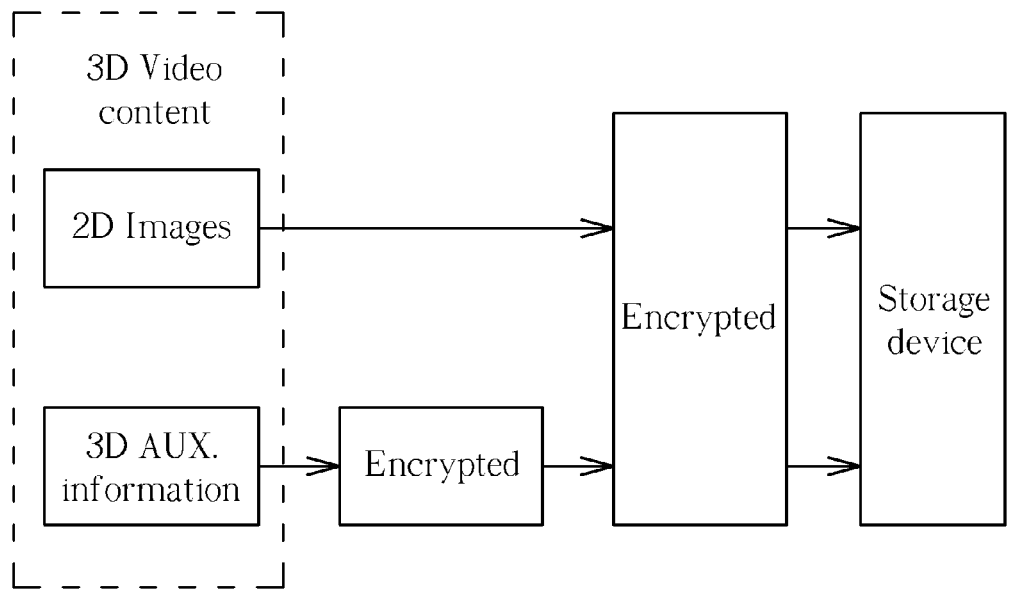
FIG. 3 is a diagram illustrating an inventive encryption manner according to a second exemplary embodiment of the present invention.
Figure 6:
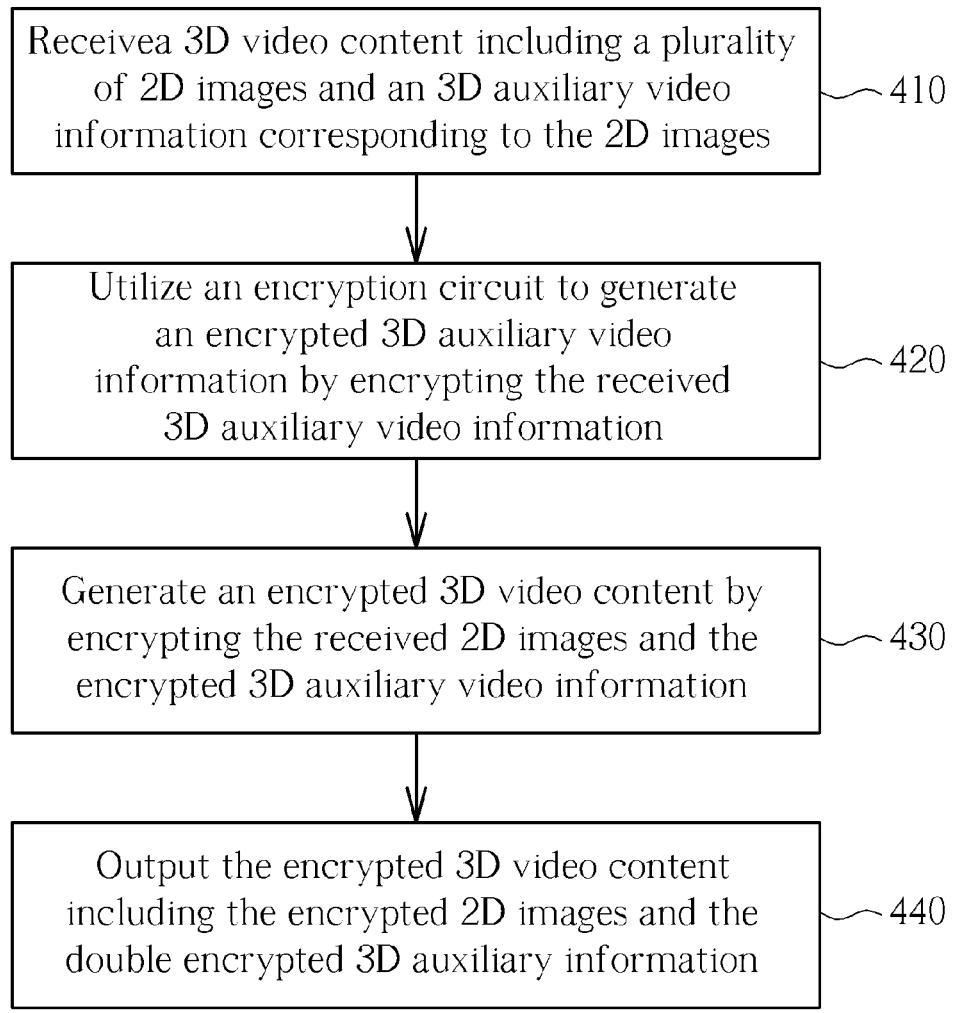
FIG. 6 is a flow chart regarding the inventive encryption manner according to the second exemplary embodiment of the present invention.

Please refer to FIG. 2 and FIG. 3. FIG. 3 is a diagram illustrating an encryption manner of the inventive method according to a second exemplary embodiment. As can be seen from the diagram in FIG. 3, a three-dimensional (3D) video content includes a plurality of two-dimensional (2D) images and a 3D auxiliary information corresponding to the 2D images. The 3D video content in this exemplary embodiment may be derived from a conversion on stereoscopic images (i.e., two 3D images next to each other or interleaved). In the second exemplary embodiment of the invention, after the 3D video content is received by the receiving circuit 210, the 3D auxiliary information of the 3D video content will be firstly encrypted by the encryption circuit 220 of the apparatus 200. Then, the whole 3D video content will be further encrypted by the encryption circuit 220. In other words, the 2D images are encrypted once whereas the encrypted 3D auxiliary information is encrypted twice. After encryption by the encryption circuit 220, the encrypted 3D video content is outputted by the outputting circuit 230, possibly to a storage device, so as to finish the encryption processing of the 3D video content. The processed 3D video content may be distributed through the Internet or broadcasting. It is also possible to publish the processed 3D video content utilizing a digital versatile disc (DVD) media. A user must get authorization in advance in order to be allowed to access the processed 3D video content. In the second exemplary embodiment, the 3D auxiliary information is double encrypted while the 2D images are encrypted once. By the double encryption of 3D auxiliary information, a two-stage authorization for the 3D video content can be achieved. The two-stage authorization can allow the user to choose the video content (i.e., 2D or 3D) he/she wants to view. For example, if he/she only wants to view the 2D video content, he/she will only be charged the fee for the 2D video content, and he/she will get the authorization of the 2D video content. If he/she only wants to view the 3D video content, he/she will be further charged an additional fee for the 3D video content, and he/she will get the authorization to access the whole 3D video content. A flow chart corresponding to the second exemplary embodiment is illustrated in FIG. 6.

Figure 4:
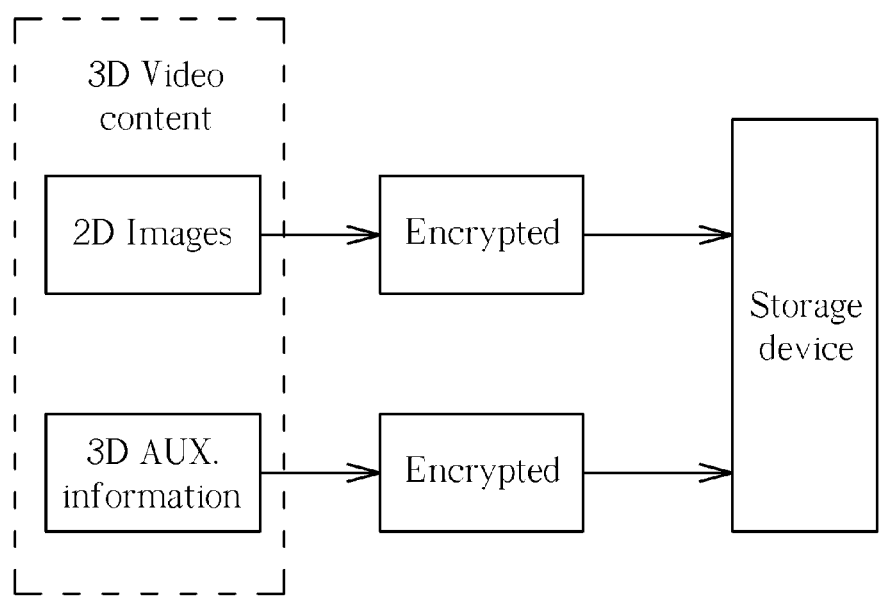
FIG. 4 is a diagram illustrating an inventive encryption manner according to a third exemplary embodiment of the present invention.
Figure 7:
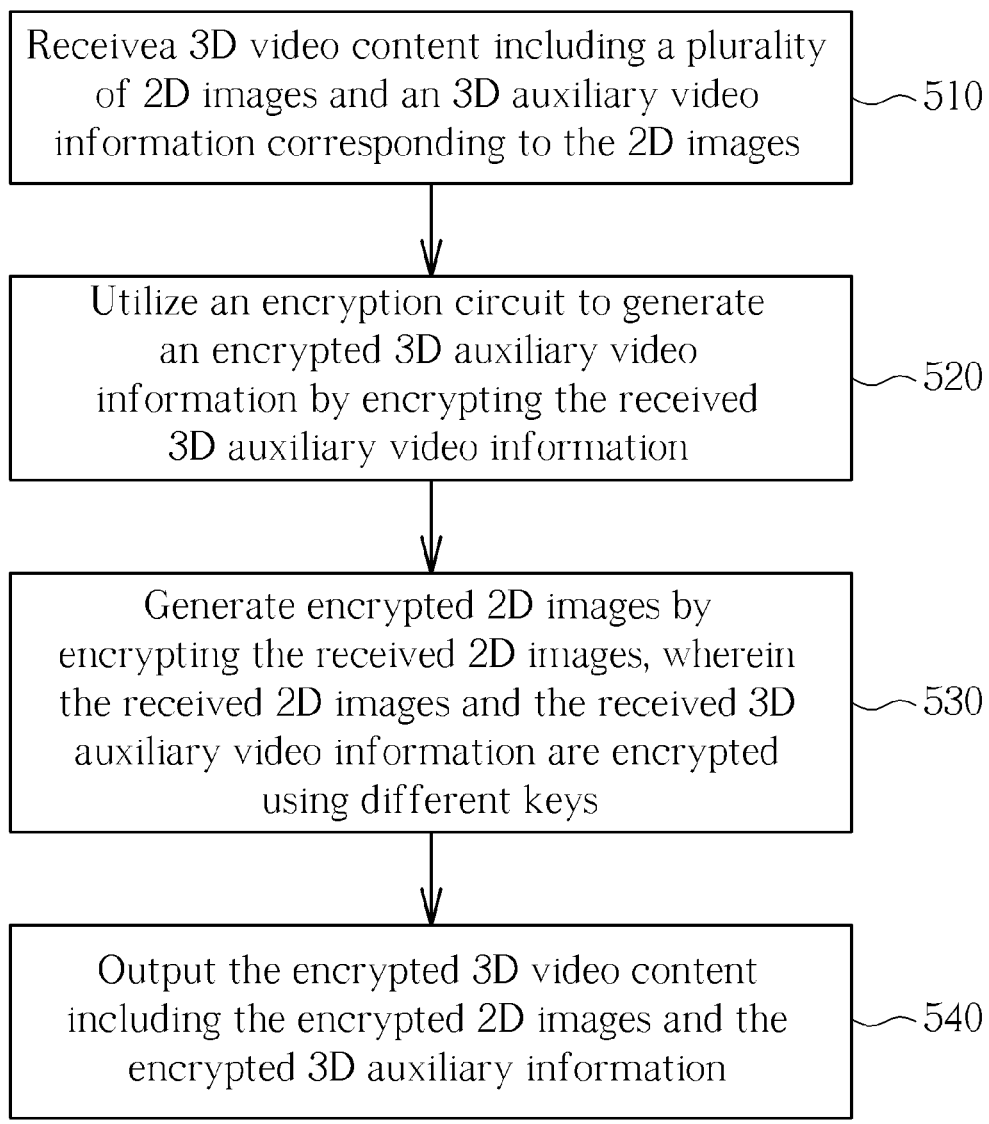
FIG. 7 is a flow chart regarding the inventive encryption manner according to the third exemplary embodiment of the present invention.

Please refer to FIG. 2 and FIG. 4. FIG. 4 is a diagram illustrating an encryption manner of the inventive method according to a third exemplary embodiment. As can be seen from the diagram in FIG. 4, a three-dimensional (3D) video content includes a plurality of two-dimensional (2D) images and a 3D auxiliary information corresponding to the 2D images. The 3D video content in this exemplary embodiment may be derived from a conversion on stereoscopic images (i.e., two 3D images next to each other or interleaved). This exemplary embodiment provides an alternative manner to achieve the two-stage authorization. In the third exemplary embodiment of the invention, the 3D auxiliary information will be firstly encrypted by the encryption circuit 220 of the apparatus 200. Then, instead of encrypting the whole 3D video content, only the 2D images will be further encrypted by the encryption circuit 220. After encryption by the encryption circuit 220, the encrypted 2D images and the encrypted 3D auxiliary information are outputted by the outputting circuit 230, possibly to a storage device, so as to finish the encryption processing of the 3D video content. The processed 3D video content may be distributed through the Internet or broadcasting. It is also possible to publish the processed 3D video content utilizing a digital versatile disc (DVD) media. A user must get the authorization in advance in order to be allowed to access the processed 3D video content. It should be noted that the encryption circuit 220 may have more than one encryption engine (not shown) so that the encryption of the 2D images and the encryption of the 3D auxiliary information can be performed in parallel. However, when the encryption circuit 220 only has one encryption engine, the encryptions of the 2D images and the 3D auxiliary information are performed in turn. Furthermore, the encryptions of the 2D images and 3D auxiliary information may respectively correspond to different keys. Thus, only the user who pays for fees of both the 2D and 3D video content will get different keys so as to be fully authorized for accessing the whole 3D video content. A flow chart corresponding to the second exemplary embodiment is illustrated in FIG. 7.

Decryption

In the following part, a detailed description regarding the decryption part of the inventive method and apparatus will be explained with reference to several exemplary embodiments. Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

Figure 8:
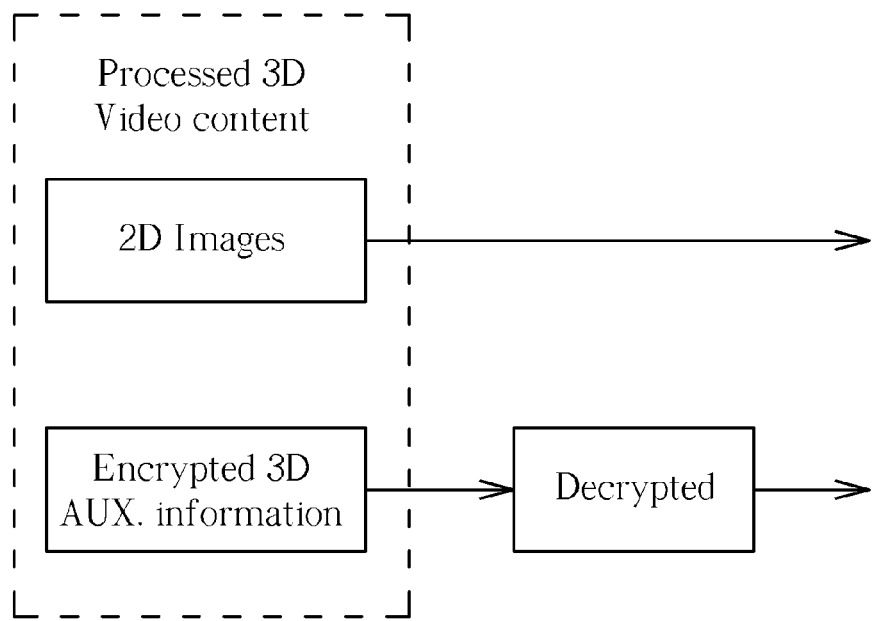
FIG. 8 is a diagram illustrating an inventive decryption manner according to a fourth exemplary embodiment of the present invention.
Figure 9:
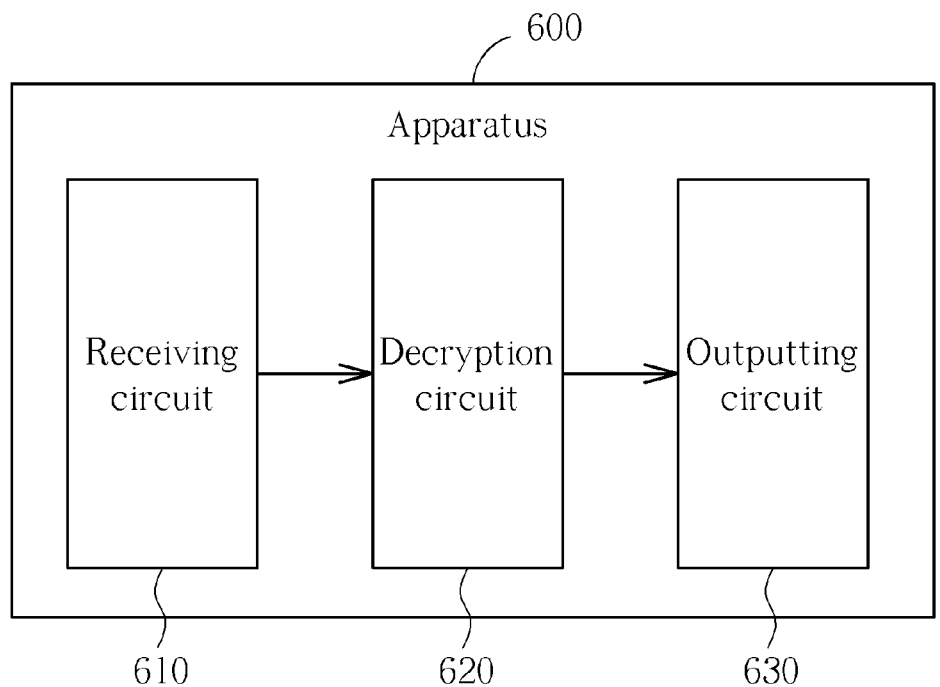
FIG. 9 is a block diagram illustrating an inventive apparatus of the present invention.
Figure 12:
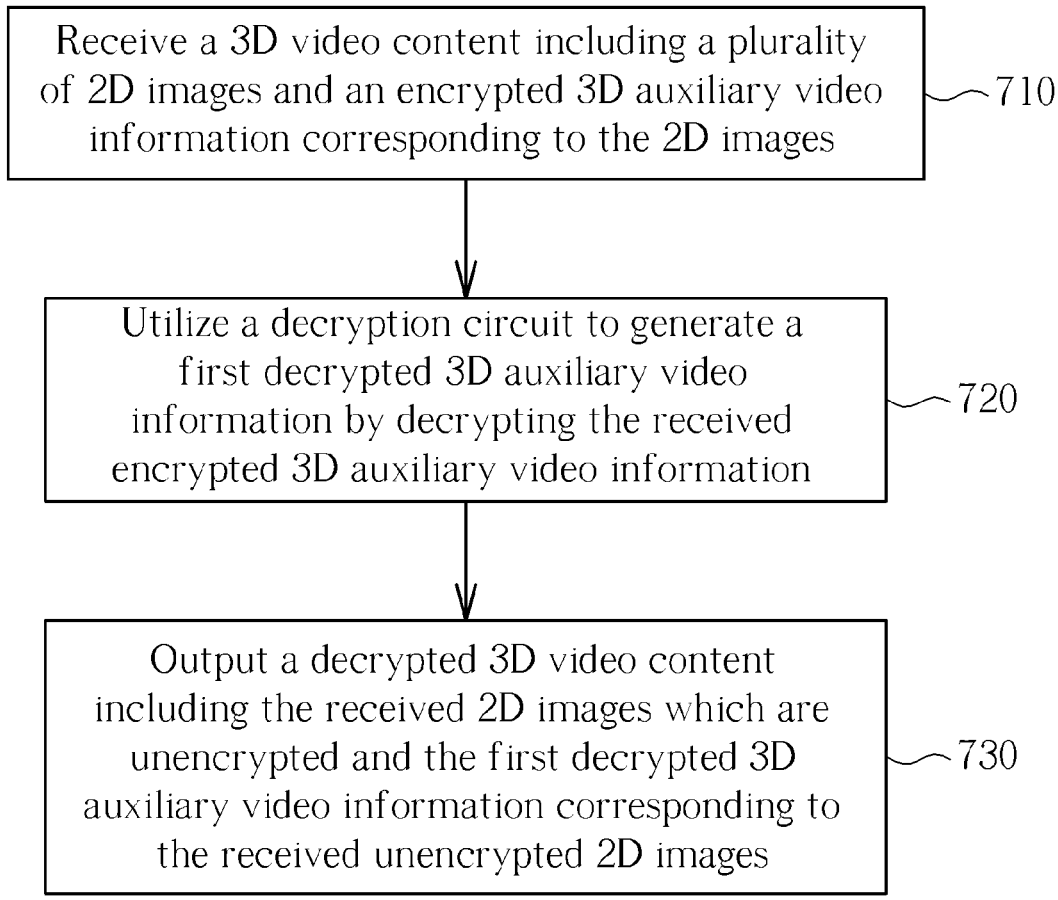
FIG. 12 is a flow chart regarding the inventive decryption manner according to the fourth exemplary embodiment of the present invention.

Please refer to FIG. 8 and FIG. 9. FIG. 8 is a diagram illustrating a decryption manner of the inventive method according to a fourth exemplary embodiment, and FIG. 9 is a block diagram illustrating an inventive apparatus of the present invention. This exemplary embodiment provides a decryption manger for processing the 3D video content which has been processed by the manner illustrated in the first exemplary embodiment of the present invention. In the fourth exemplary embodiment, a receiving circuit 610 of the inventive apparatus 600 as shown in FIG. 9 receives the unencrypted 2D images and the encrypted 3D auxiliary information corresponding to the unencrypted 2D images of the processed 3D video content. Accordingly, the received encrypted 3D auxiliary information will be decrypted by a decryption circuit 620 of the apparatus 600 to generate a first decrypted 3D auxiliary video information. After decryption, the received 2D images which are unencrypted and the first decrypted 3D auxiliary video information will be outputted by an outputting circuit 630 of the apparatus 600 to finish the decryption processing of the 3D video content. The processed 3D video content processed by the apparatus 600 may be further inputted to the user's stereoscopic displays or multi-view displays to present the 3D visual effect according to depth image based rendering (DIBR) technology. In the fourth exemplary embodiment, the unauthorized user for the whole 3D video content is only allowed to view the 2D video composed of the unencrypted 2D images (that is, the encrypted 3D auxiliary information will not be decrypted, and the outputting circuit 630 only outputs the unencrypted 2D images). The user can obtain 3D visual effect when he/she is authorized. The encrypted 3D auxiliary information is decrypted according to the corresponding decryption information (i.e., decryption key). A corresponding flow chart is illustrated in FIG. 12.

Figure 10:
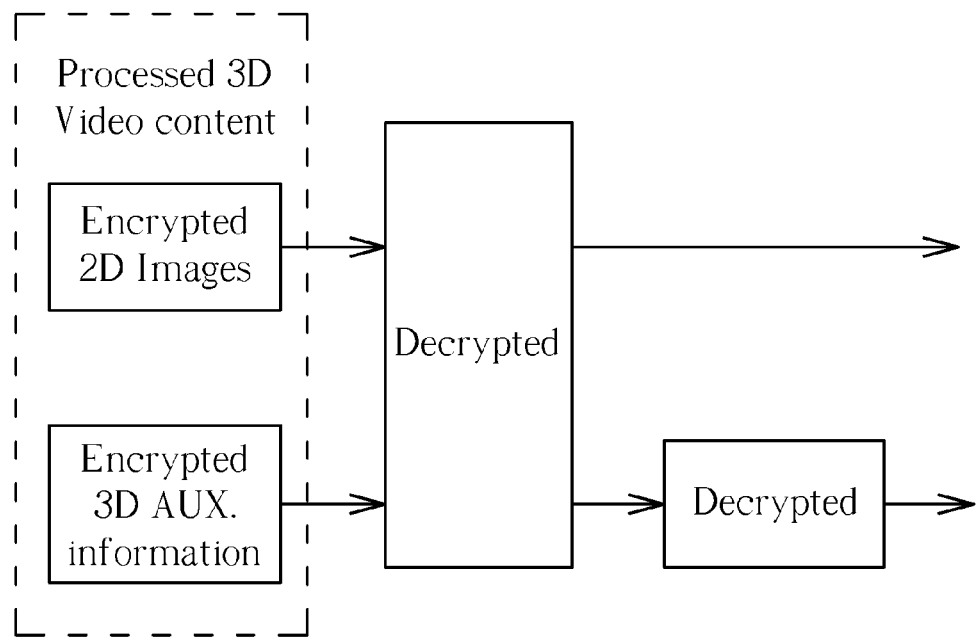
FIG. 10 is a diagram illustrating an inventive decryption manner according to a fifth exemplary embodiment of the present invention.
Figure 13:
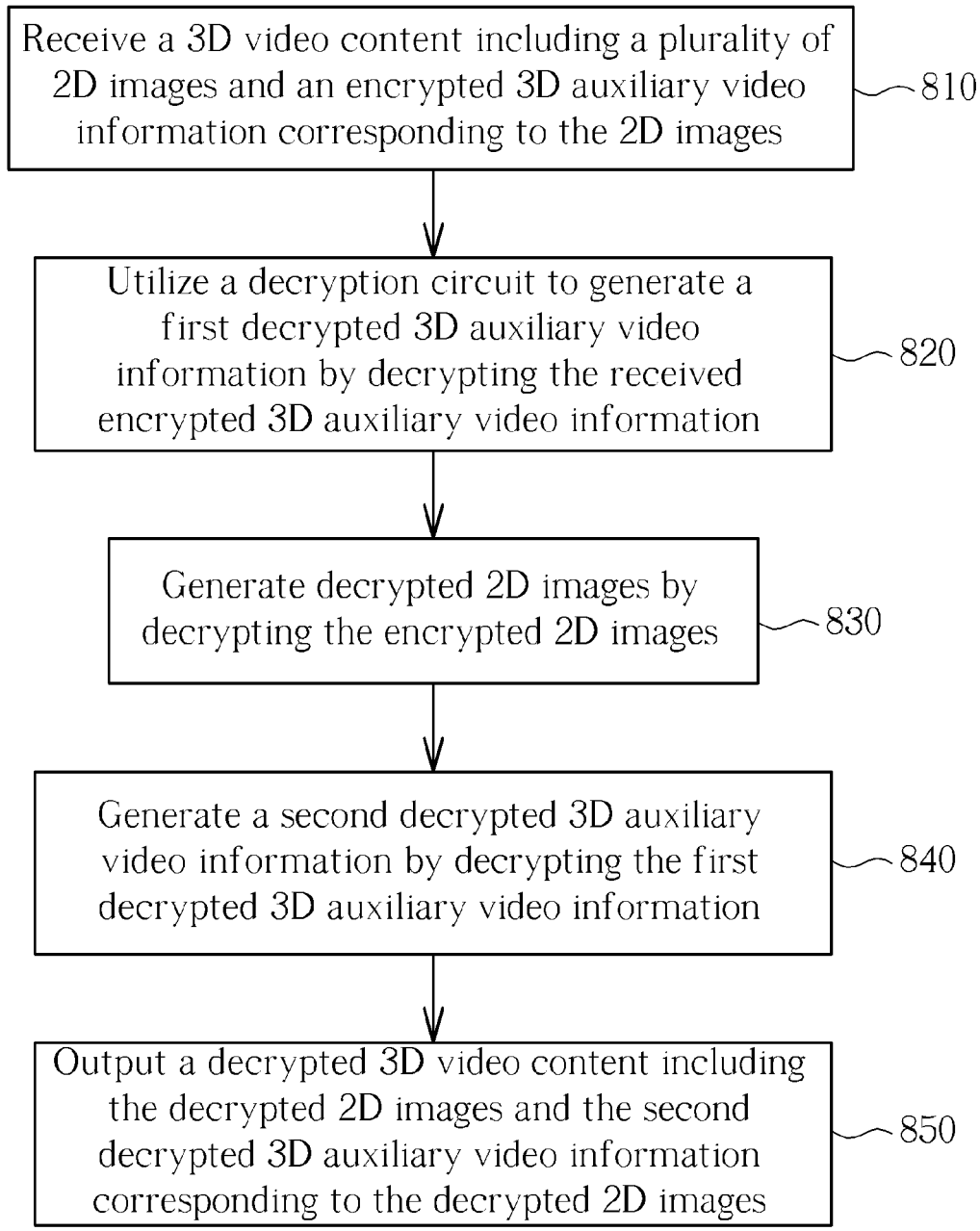
FIG. 13 is a flow chart regarding the inventive decryption manner according to the fifth exemplary embodiment of the present invention.

Please refer to FIG. 9 and FIG. 10 simultaneously. FIG. 10 is a diagram illustrating a decryption manner of the inventive method according to a fifth exemplary embodiment. This exemplary embodiment provides a decryption manger for processing the 3D video content which has been processed by the manner illustrated in the second exemplary embodiment of the present invention. In the fifth exemplary embodiment, the receiving circuit 610 of the inventive apparatus 600 will receive the encrypted 3D video content which includes the encrypted 2D images and the double-encrypted 3D auxiliary information. Accordingly, the decryption circuit 620 of the apparatus 600 will firstly decrypt the encrypted 3D video content to generate a first decrypted 3D auxiliary information and the decrypted 2D images. Accordingly, the first decrypted 3D auxiliary information may be further decrypted by the decryption circuit 620 of the apparatus 600 to generate a second decrypted three-dimensional auxiliary video information. After decryption, the outputting circuit 630 outputs the decrypted 2D images and the second decrypted 3D auxiliary video information to finish the decryption processing of the 3D video content. The processed 3D video content may be further inputted to the user's stereoscopic displays or multi-view displays to present the 3D visual effect according to depth image based rendering (DIBR) technology. This exemplary embodiment achieves the two-stage authorization. Depending on the user's payment, he/she will get different authorizations for accessing the 3D video content. For example, if he/she only wants to view the 2D video content, he/she will only be charged the fee for the 2D video content, and he/she will get the authorization of the 2D video content. In this case, the second decrypted 3D auxiliary information will not be generated, and only the decrypted 2D images will be outputted by the outputting circuit 630 of the apparatus 600. If he/she only wants to view the 3D video content, he/she will be further charged an additional fee for the 3D video content, and he/she will get the full authorization to access the whole 3D video content. In this case, the second decrypted 3D auxiliary information will be generated by decrypting the first decrypted 3D auxiliary information, and the decrypted 2D images and the second decrypted 3D auxiliary information will be outputted by the outputting circuit 630 of the apparatus 600. A corresponding flow chart is illustrated in FIG. 13.

Figure 11:
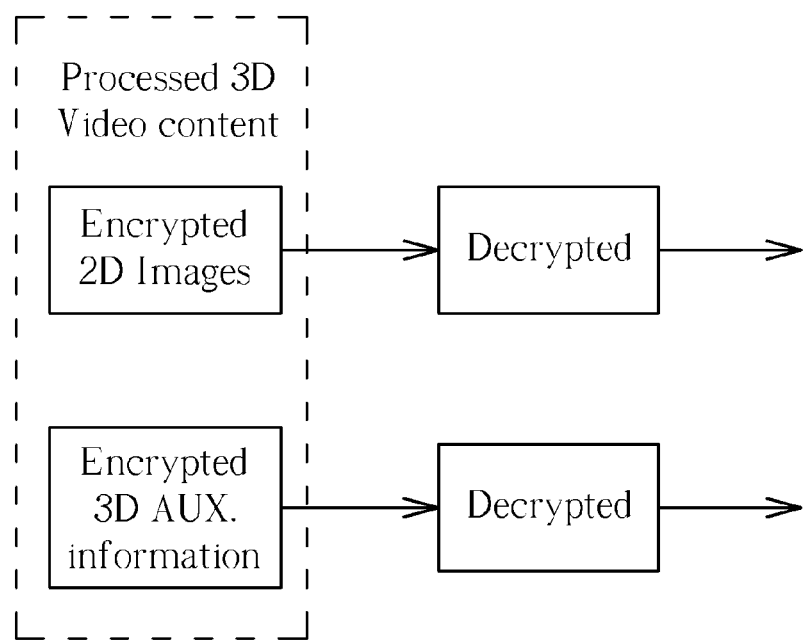
FIG. 11 is a diagram illustrating an inventive decryption manner according to a sixth exemplary embodiment of the present invention.
Figure 14:
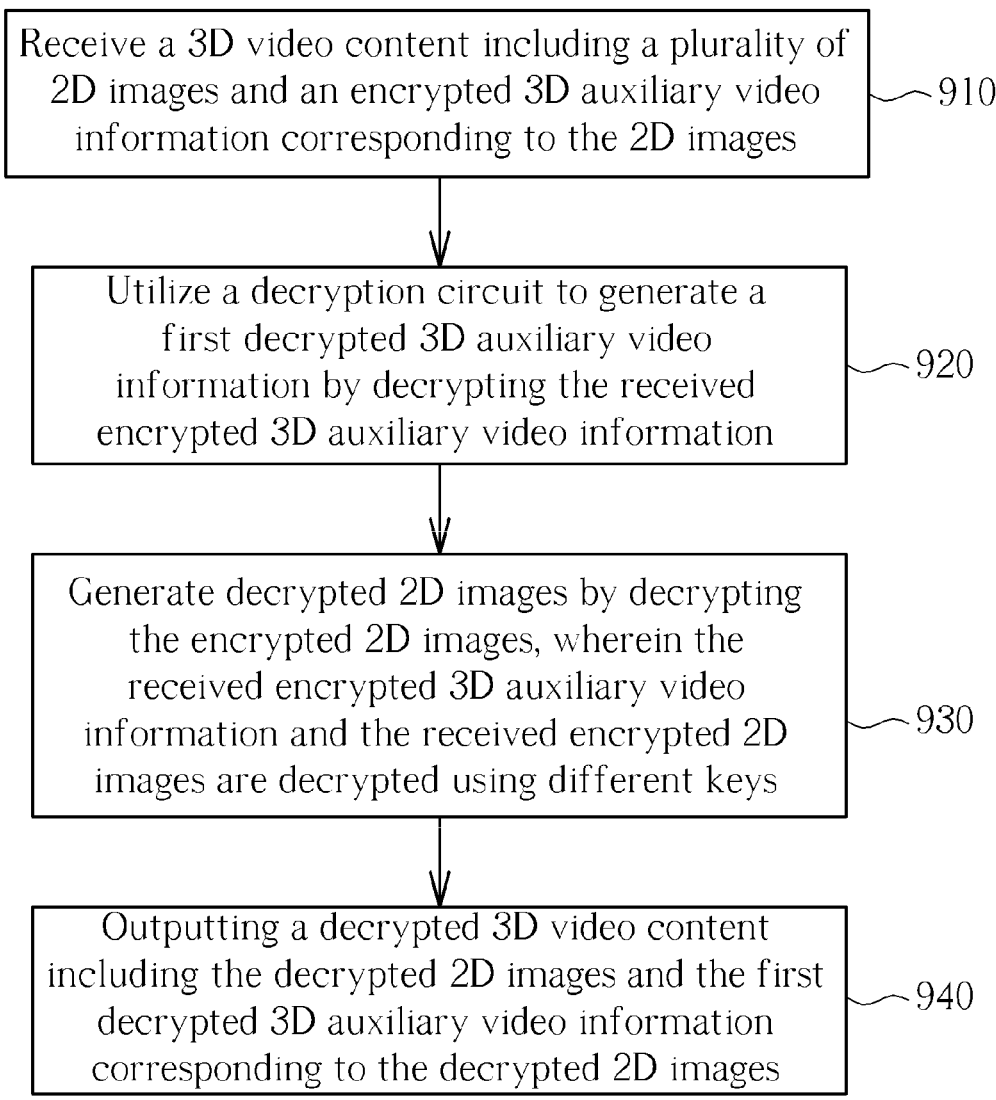
FIG. 14 is a flow chart regarding the inventive decryption manner according to the sixth exemplary embodiment of the present invention.

Please refer to FIG. 10 and FIG. 11 simultaneously. FIG. 11 is a diagram illustrating a decryption manner of the inventive method according to a sixth exemplary embodiment. This exemplary embodiment provides a decryption manger for processing the 3D video content which has been processed by the manner illustrated in the third exemplary embodiment of the present invention. In the sixth exemplary embodiment, the receiving circuit 610 of the inventive apparatus 600 will receive the encrypted 3D video content which includes the encrypted 2D images and the encrypted 3D auxiliary information where they are encrypted using different keys. Accordingly, the decryption circuit 620 of the apparatus 600 will respectively decrypt the encrypted 2D images and the encrypted 3D auxiliary information to generate decrypted 2D images and a first decrypted 3D auxiliary information. It should be noted that the decryption circuit 620 may have more one decryption engine (not shown) so that the decryption of the encrypted 2D images and the decryption of the encrypted 3D auxiliary information can be performed in parallel. However, when the decryption circuit 220 only has one decryption engine, the encryptions of the encrypted 2D images and the encrypted 3D auxiliary information are performed in turn. After decryption, the outputting circuit 630 outputs the decrypted 2D images and the first decrypted 3D auxiliary video information to finish the decryption processing of the 3D video content. The processed 3D video content may be further inputted to the user's stereoscopic displays or multi-view displays to present the 3D visual effect according to depth image based rendering (DIBR) technology. This exemplary embodiment achieves the two-stage authorization. Depending on the user's payment, he/she will get different authorization keys for accessing the video content. For example, if he/she only wants to view the 2D video content, he/she will only be charged the fee for the 2D video content, and he/she will get the authorization (i.e., authorization key) of the 2D video content. In this case, the first decrypted 3D auxiliary information will not be generated, and only the decrypted 2D images will be outputted by the outputting circuit 630 of the apparatus 600. If he/she only wants to view the 3D video content, he/she will be further charged an additional fee for the 3D video content, and he/she will get the full authorization (i.e., two authorization keys) to access the whole 3D video content. In this case, the first decrypted 3D auxiliary information will be generated by decrypting the encrypted 3D auxiliary information, and the decrypted 2D images and the first decrypted 3D auxiliary information will be outputted by the outputting circuit 630 of the apparatus 600. A corresponding flow chart is illustrated in FIG. 14.

In conclusion, by respectively and separately encrypting/decrypting 2D images and the 3D auxiliary information according to different manners (e.g. different keys or encrypted at different times), the present invention not only can fully protect the 3D video content but also can provide a flexible payment/authorization mechanism for the user to access or view 3D video content.

Those skilled in the art will readily observe that numerous modifications and alterations of the device and method may be made while retaining the teachings of the invention.

What is claimed is:

1. A method of processing and authorizing a three-dimensional video content, comprising:
    receiving the three-dimensional video content including a plurality of two-dimensional images and a three-dimensional auxiliary video information corresponding to the two-dimensional images;
    utilizing an encryption circuit to encrypt the received three-dimensional auxiliary video information;
    generating an encrypted three-dimensional video content by encrypting the received two-dimensional images that has not been encrypted and by encrypting the encrypted three-dimensional auxiliary video information again; and
    authorizing the encrypted received two-dimensional images and the encrypted received three-dimensional auxiliary video information respectively according to different payments.

2. The method of claim 1, further comprising:
    outputting the encrypted two-dimensional images and the encrypted three-dimensional auxiliary video information corresponding to the received two-dimensional images.

3. The method of claim 1, wherein the three-dimensional auxiliary video information includes depth information.

4. The method of claim 1, wherein the three-dimensional auxiliary video information includes delta information.

5. The method of claim 1, wherein the three-dimensional auxiliary video information includes motion vector information.

6. A method of processing and authorizing a three-dimensional video content, comprising:
    receiving the three-dimensional video content including a plurality of encrypted two-dimensional images and an encrypted three-dimensional auxiliary video information corresponding to the two-dimensional images;
    utilizing a decryption circuit to generate decrypted two-dimensional images by decrypting the encrypted two-dimensional image;
    utilizing the decryption circuit to generate a first decrypted three-dimensional auxiliary video information by decrypting the received encrypted three-dimensional auxiliary video information;
    utilizing the decryption circuit to generate a second decrypted three-dimensional auxiliary video information by decrypting the first decrypted three-dimensional auxiliary video information;
    outputting the decrypted two-dimensional images and the second decrypted three-dimensional auxiliary video information; and
    authorizing the decrypted two-dimensional images, the first decrypted three-dimensional auxiliary video information, and the second decrypted three-dimensional auxiliary video information respectively according to different payments.

7. The method of claim 6, wherein the encrypted three-dimensional auxiliary video information includes encrypted depth information.

8. The method of claim 6, wherein the encrypted three-dimensional auxiliary video information includes encrypted delta information.

9. The method of claim 6, wherein the encrypted three-dimensional auxiliary video information includes encrypted motion vector information.

10. An apparatus for processing and authorizing a three-dimensional video content, comprising:
    a receiving circuit, for receiving the three-dimensional video content including a plurality of two-dimensional images and a three-dimensional auxiliary video information corresponding to the two-dimensional images; and
    an encryption circuit, coupled to the receiving circuit, for generating an encrypted three-dimensional auxiliary video information by encrypting the received three-dimensional auxiliary video information, generating an encrypted three-dimensional video content by encrypting the received two-dimensional images that has not been encrypted and by encrypting the encrypted three-dimensional auxiliary video information again, and authorizing the encrypted received two-dimensional images and the encrypted received three-dimensional auxiliary video information respectively according to different payments.

11. The apparatus of claim 10, further comprising:
    an outputting circuit, coupled to the encryption circuit, for outputting the encrypted two-dimensional images and the encrypted three-dimensional auxiliary video information corresponding to the received two-dimensional images into a storage device.

12. The apparatus of claim 10, wherein the three-dimensional auxiliary video information includes depth information.

13. The apparatus of claim 10, wherein the three-dimensional auxiliary video information includes delta information.

14. The apparatus of claim 10, wherein the three-dimensional auxiliary video information includes motion vector information.

15. An apparatus for processing and authorizing a three-dimensional video content, comprising:
    a receiving circuit, for receiving the three-dimensional video content including a plurality of encrypted two-dimensional images and an encrypted three-dimensional auxiliary video information corresponding to the two-dimensional images;

a decryption circuit, coupled to the receiving circuit, for generating a first decrypted three-dimensional auxiliary video information by decrypting the received encrypted three-dimensional auxiliary video information, generating a second decrypted three-dimensional auxiliary video information by decrypting the first decrypted three-dimensional auxiliary video information, generating decrypted two-dimensional images by decrypting the encrypted two-dimensional images, and authorizing the decrypted two-dimensional images, the first decrypted three-dimensional auxiliary video information, and the second decrypted three-dimensional auxiliary video information respectively according to different payments; and an outputting circuit, coupled to the decryption circuit, for outputting the decrypted two-dimensional images and the second decrypted three-dimensional auxiliary video information corresponding to the decrypted two-dimensional images.

16. The apparatus of claim 15, wherein the encrypted three-dimensional auxiliary video information includes encrypted depth information.

17. The apparatus of claim 15, wherein the encrypted three-dimensional auxiliary video information includes encrypted delta information.

18. The apparatus of claim 15, wherein the encrypted three-dimensional auxiliary video information includes encrypted motion vector information.

19. A method of processing and authorizing a three-dimensional video content, comprising:

receiving the three-dimensional video content including a plurality of two-dimensional images and a three-dimensional auxiliary video information that is video information corresponding to the two-dimensional images;

utilizing an encryption circuit to generate an encrypted three-dimensional video content by respectively encrypting the received two-dimensional images and the received three-dimensional auxiliary video information using different keys; and authorizing the encrypted received two-dimensional images and the encrypted received three-dimensional auxiliary video information respectively according to different payments.

20. A method of processing and authorizing a three-dimensional video content, comprising:

receiving the three-dimensional video content including a plurality of encrypted two-dimensional images and an encrypted three-dimensional auxiliary video information that is video information corresponding to the two-dimensional images;

utilizing a decryption circuit to generate a decrypted three-dimensional auxiliary video information by decrypting the encrypted three-dimensional auxiliary video information;

utilizing the decryption circuit to generate decrypted two-dimensional images by decrypting the encrypted two-dimensional images, wherein the encrypted three-dimensional auxiliary video information and the encrypted two-dimensional images are decrypted using different keys;

outputting the decrypted two-dimensional images and the decrypted three-dimensional auxiliary video information corresponding to the decrypted two-dimensional images; and authorizing the decrypted two-dimensional images and the decrypted three-dimensional auxiliary video information respectively according to different payments.

* * * * *